United States Patent [19]

Michel et al.

[11] Patent Number: 5,414,316
[45] Date of Patent: May 9, 1995

[54] MOTOR VEHICLE GEAR MOTOR DRIVE

[75] Inventors: Peter Michel, Kleinrinderfeld; Alfred Kümmel, Kitzingen, both of Germany

[73] Assignee: Siemens Aktiengesellschaft, Munich, Germany

[21] Appl. No.: 870,548

[22] Filed: Apr. 17, 1992

[30] Foreign Application Priority Data

| Apr. 18, 1991 | [EP] | European Pat. Off. | 91106240 |
| Mar. 10, 1992 | [EP] | European Pat. Off. | 92104094 |
| Mar. 10, 1992 | [DE] | Germany | 9203194 U |
| Mar. 19, 1992 | [EP] | European Pat. Off. | 92104812 |

[51] Int. Cl.$^6$ ............................................. H02K 5/16
[52] U.S. Cl. ............................................. 310/90
[58] Field of Search .................. 310/90, 83, 85, 88, 310/98, 99; 74/425, 411, 409

[56] References Cited

U.S. PATENT DOCUMENTS

| 2,771,786 | 11/1956 | Gilbert et al. | 74/421 |
| 3,745,716 | 7/1973 | Turner | 51/96 |
| 3,874,722 | 4/1975 | Pickles | 296/137 |
| 4,152,612 | 5/1979 | Endo | 310/83 |
| 4,633,375 | 12/1986 | Tres | 362/35 |
| 4,643,040 | 2/1987 | Adam et al. | 74/425 |
| 4,739,678 | 4/1988 | Miura et al. | 74/665 T |
| 4,993,277 | 2/1991 | Adam et al. | 74/425 |

FOREIGN PATENT DOCUMENTS

| 0420212 | 4/1991 | European Pat. Off. |
| 2196540 | 3/1974 | France |
| 2705633 | 8/1977 | Germany |
| 8228605 | 2/1986 | Germany |
| 8903714 | 3/1990 | Germany |
| 8520901 | 8/2985 | Germany |
| 2176943 | 1/0787 | United Kingdom |

Primary Examiner—Thomas M. Dougherty
Assistant Examiner—Matthew V. Nguyen
Attorney, Agent, or Firm—Kenyon & Kenyon

[57] ABSTRACT

For a reliable moisture-tight seal at the separation point between a motor housing and a gear housing with a drive shaft of the motor projecting into the gear housing as a helical shaft and its mounting (cup bearing) in the region of the separation point, the cup bearing has a double-lip seal in the sense of a complete moisture seal of the motor housing relative to the gear housing assigned to it. An outside seal of the gear housing is thus eliminated. In order to be able to guarantee long maintenance-free operating lifetimes in spite of penetration of moisture into the gear housing part, the worm wheel which meshes with the helical shaft made of steel, which projects into the gear housing part, consists of POM plastic with lubrication-modified POM plastic added in a certain mixture ratio.

14 Claims, 1 Drawing Sheet

MOTOR VEHICLE GEAR MOTOR DRIVE

BACKGROUND OF THE INVENTION

This invention relates to a motor vehicle gear motor drive having a motor housing and a gear housing sealed against one another by a moisture seal. Specifically, the invention relates to such a device for a window drive mechanism.

A window drive mechanism of this type is known from DE-U-89 03 714. In this case, the drive shaft projects into the gear housing as a flying helical drive shaft and meshes with a gear wheel of a cable-operated window mechanism. In the transition region between the motor housing and the gear housing, the drive shaft is mounted in a flange of the gear housing which serves for attachment to the motor housing. The drive shaft is also mounted by a further cup bearing at the end of the electric motor facing away from the gear housing. For protection against moisture which would penetrate into the motor housing otherwise, a seal is provided between the gear housing and the gear housing cover which closes it, as well as between the incoming cable lines and their cable guides on the gear housing side, and between the frontal sides of these components, which come to rest in front of one another in the reciprocal assembly of motor housing and gear housing. These seals ensure that the complete unit of the window drive mechanism is structured to be water-tight. To lubricate bearing and gear parts of window mechanisms, non-liquid permanent lubricants are usually added to the bearing and gear parts separately, during the initial assembly.

It is also known that a motor-gear unit with a double-lip seal with a lubricant depot in the region of a bearing between the motor housing part and the gear housing part is known from EP-A2-0 420 212, this solution relates to a large machine system with an oil-filled transmission, where a seal is pressed onto the drive shaft, by means of a special holder ring, at an axial distance in front of a ball bearing provided as a mounting, to prevent entry of oil into the motor housing part. Also, the seal has only one sealing lip to seal off oil, and another dust lip, located axially behind it, for protection relative to the ball bearing.

SUMMARY OF THE INVENTION

The present invention provides moisture protection of the electrical and bearing-related parts with less design and assembly effort than required by current gear motor drives. Further, the present invention reduces the effort required for production and operation of a gear motor drive which is sealed against moisture, especially a motor vehicle window mechanism drive.

According to this invention, these objects and others are accomplished, with a motor-gear unit with a double-lip seal pressed against the cup bearing of the drive shaft.

The double-lip seal of this invention, in combination with the known seal between the attachment flanges of the motor housing and the gear housing, guarantees protection of all components sensitive to moisture. The seal against the penetration of moisture used in known gear housing can be eliminated, and is therefore not provided. In order to nevertheless be able to guarantee long periods of operation without maintenance work, a self-lubricating worm wheel, driven by a helical shaft projecting out of the motor housing, is provided in the gear housing part according to one embodiment of the invention. Preferably, a worm wheel of POM plastic with a lubrication-modified POM plastic added in a ratio of 20% to 50% is used in combination with a helical shaft consisting of hardened steel. This allows the elimination of any need for the addition of external grease to the gear drive between the helical shaft and the worm wheel. Also, a self-locking friction coefficient of the worm wheel on the helical shaft can be achieved, taking into consideration the usual pitch angles.

The present invention as well as further advantageous developments of the invention will be explained in greater detail below, on the basis of an embodiment schematically represented in the figures.

DETAILED DESCRIPTION

Figure 1:
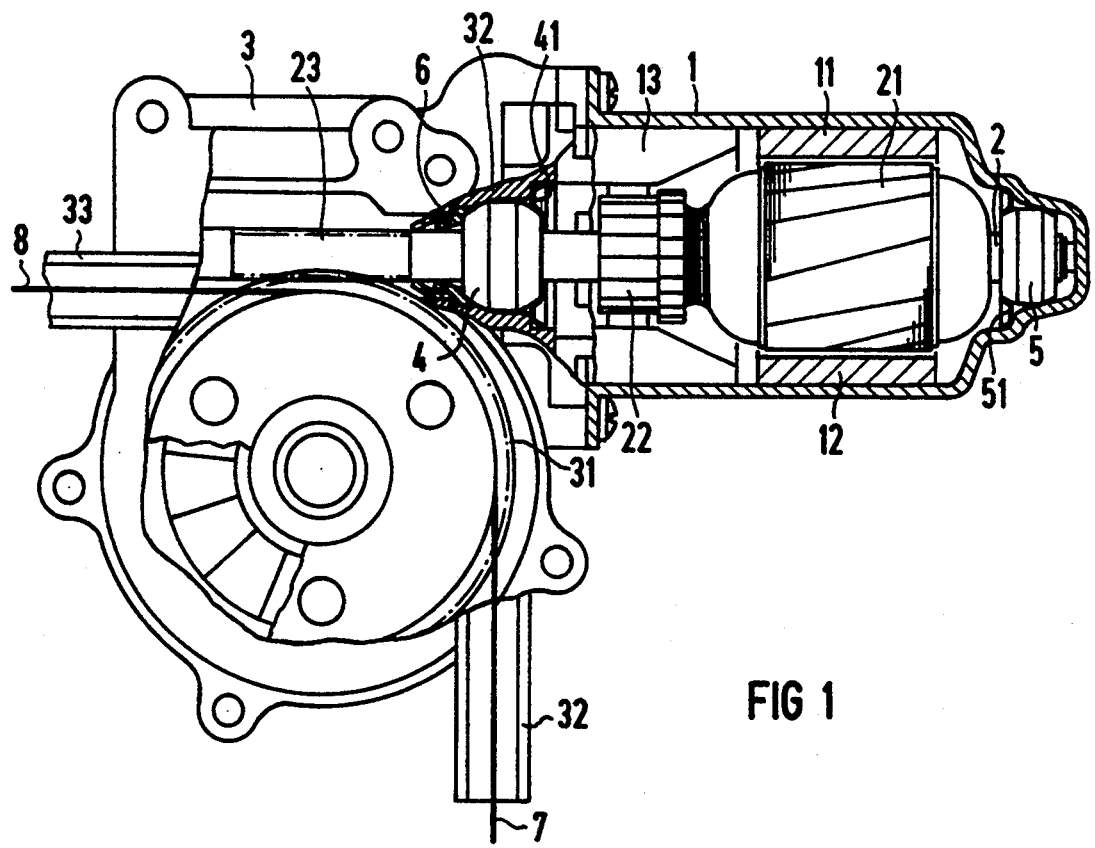
FIG. 1 illustrates the basic structure of a cable window mechanism drive of the present invention in a longitudinal view of an axial cross-section.

FIG. 1 shows the basic structure of a motor vehicle cable window mechanism drive with an electric motor in a longitudinal view of an axial cross-section, with a motor housing part 1 and a gear housing part 3, which is flanged on with a seal, not visible here, placed in between. Inside the pot-shaped motor housing part 1, at its circumferential surface, permanent magnet shells 11, 12, in the form of partial shells, are mounted for electrical excitation. Axially in front of the permanent magnet shells 11, 12, on the gear housing side, is a brush system 13 of the commutator motor 22. The drive shaft 2, which holds a wound rotor package 21 as well as a commutator 22, is mounted in a first cup bearing 4 and in a second cup bearing 5. Cup bearing 4 is held in cup bearing mounting 32 which is molded onto the gear housing 3. Cup bearing 5 is mounted in the pot base of the motor housing 1, facing away from the gear housing part. The drive shaft 2 projects into the gear housing part 3 with a helical shaft 23, as a flying shaft, and meshes with a gear wheel 31. The cup bearing 4 is pressed into the ball socket-shaped cup mounting 32 of the attachment flange of the gear housing part 3 by means of a clamp collar plate 41. The cup bearing 5 is pressed into a pot-shaped holder of the pot base of the motor housing part 1 by means of a clamp collar plate 51.

Figure 2:
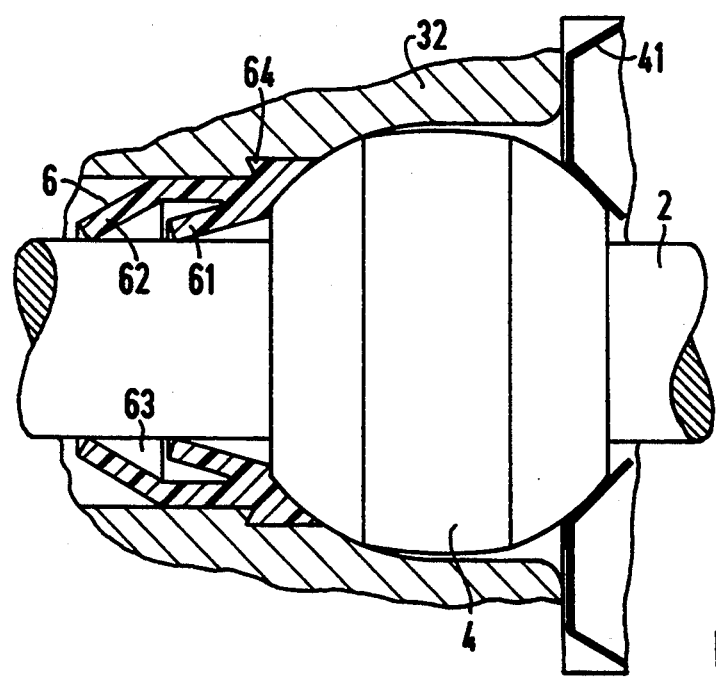
FIG. 2 is an enlarged view of FIG. 1, showing the double-lip seal held in the cup bearing in greater detail.

As is particularly evident from the enlarged detail view of FIG. 2, according to this invention, a double-lip seal 6 is held in the cup mounting 32 in such a way that it is held in place against a holder 64 on the gear housing side with a positive lock by the pressure of the cup. The double lip seal 6 is pressed down onto the drive shaft 2 to form a seal with its first lip 61 and its second lip 62 by axial pressure on the cup 4. The axial pressure is caused, for example, by means of the clamp collar plate 41, or by axial pull on the drive shaft 2 due to excess pressure in the gear housing part 3 or a partial vacuum in the motor housing part 1. The sealing lips 61 and 62 are arranged at an axial distance and molded as part of the shaft seal 6 in such a way that a lubricant depot 63 is formed between them which can hold a lubricant for permanent lubrication of the shaft bearing. According to the invention, both the electrical components in the motor housing and all bearings of the drive shaft can be closed off from the outside to form a moisture-tight seal without the need for the complete sealing of the entire motor-gear unit with several seals affixed at various locations on the gear housing part. Thus, referring to FIG. 1, a seal of the incoming or outgoing cable line 7 or 8, respectively, relative to its cable guide 32 or 33, respectively, on the gear housing part 3, is eliminated.

In order to nevertheless be able to avoid overly high gear wear in spite of the elimination of an outer seal of the gear housing part 3, a worm wheel 31 of POM plastic with an addition of lubrication-modified POM plastic is provided in connection with a drive shaft 2, which usually consists of steel. This eliminates the need for the external addition of lubricant grease, which might be washed out by penetrating moisture. At a mixture ratio of 20%–50% a friction coefficient of the worm wheel 31 relative to the helical shaft 23, which is usually made from hardened steel, can be achieved which guarantees secure self-locking in the sense of eliminating undesirable opening movements with a movement of the worm wheel 31 counter to its motor side drive direction, even after long operational lifetimes. This friction coefficient, and thus the self-locking, depends upon the pitch angle of the helical shaft. POM plastics normally include polyoxymethylene and polyacetal. Alternatively, the worm wheel may be made of Delrin 100 or 500 with an addition of lubrication-modified Delrin 100Cl or 500CL, respectively.

What is claimed is:

1. A motor vehicle gear motor drive for a window drive, comprising:
   (a) a motor housing and a gear housing attached to said motor housing with a first seal disposed between said motor housing and said gear housing;
   (b) an electric motor drive shaft;
   (c) a cup bearing mounting attached to said gear housing and encircling said drive shaft; and
   (d) a double-lip seal located in said cup bearing mounting on the gear housing side of said cup bearing, encircling said drive shaft, and comprising two conical portions forming a lubricant depot between said two conical portions, wherein said seal is pressed against said drive shaft and said cup bearing mounting by pressure exerted thereupon by said cup bearing.

2. The motor vehicle gear motor drive for a window drive of claim 1, wherein a clamp collar plate exerts said pressure upon said cup bearing, thereby producing the pressure exerted in said seal.

3. The motor vehicle gear motor drive for a window drive of claim 2, wherein said double-lip seal forms a moisture barrier when pressed against said drive shaft and said cup bearing mounting, such that said motor housing is sealed against external moisture.

4. The motor vehicle gear motor drive for a window drive of claim 3, further comprising a helical shaft mounted on said drive shaft in said gear housing and a worm wheel meshing with said helical shaft in said gear housing to form a gear drive.

5. The motor vehicle gear motor drive for a window drive of claim 4, wherein said gear drive is self-lubricating.

6. The motor vehicle gear motor drive for a window drive of claim 5, wherein said helical shaft is comprised of steel and said worm wheel is comprised of POM plastic and lubrication-modified POM plastic.

7. The motor vehicle gear motor drive for a window drive of claim 6, wherein said lubrication-modified POM plastic creates a self-locking friction coefficient between said worm wheel and said helical shaft.

8. The motor vehicle gear motor drive for a window drive of claim 7, wherein said lubrication-modified POM plastic comprises 20%–50% of the total amount of POM plastic, the exact amount of said lubrication-modified POM plastic depending upon said friction coefficient between said worm wheel and said helical shaft.

9. The motor vehicle gear motor drive for a window drive of claim 5, wherein said helical shaft is comprised of steel and said worm wheel is comprised of Delrin 100 and lubrication-modified Delrin 100CL.

10. The motor vehicle gear motor drive for a window drive of claim 9, wherein said lubrication-modified Delrin 100CL creates a self-locking friction coefficient between said worm wheel and said helical shaft.

11. The motor vehicle gear motor drive for a window drive of claim 10, wherein said lubrication-modified Delrin 100CL comprises 20%–50% of the total amount of Delrin 100, the exact amount of said lubrication-modified Delrin 100 depending upon said friction coefficient between said worm wheel and said helical shaft.

12. The motor vehicle gear motor drive for a window drive of claim 5, wherein said helical shaft is comprised of steel and said worm wheel is comprised of Delrin 500 and lubrication-modified Delrin 500CL.

13. The motor vehicle gear motor drive for a window drive of claim 12, wherein said lubrication-modified Delrin 500CL creates a self-locking friction coefficient between said worm wheel and said helical shaft.

14. The motor vehicle gear motor drive for a window drive of claim 13, wherein said lubrication-modified Delrin 500CL comprises 20%–50% of the total amount of Delrin 500, the exact amount of said lubrication-modified Delrin 500 depending upon said friction coefficient between said worm wheel and said helical shaft.

* * * * *